United States Patent [19]
Pechey et al.

[11] Patent Number: 4,469,515
[45] Date of Patent: Sep. 4, 1984

[54] PRODUCTION OF PIGMENTS

[75] Inventors: David T. Pechey, Clydebank; John H. Coy, Stewarton, both of Scotland

[73] Assignee: Ciba-Geigy Corporation, Ardsley, N.Y.

[21] Appl. No.: 376,989

[22] Filed: May 10, 1982

Related U.S. Application Data

[62] Division of Ser. No. 203,940, Nov. 4, 1980, Pat. No. 4,341,701.

[30] Foreign Application Priority Data

Jul. 11, 1979 [GB] United Kingdom ................. 7938591

[51] Int. Cl.$^3$ ............................................. C09D 11/02
[52] U.S. Cl. ...................................... 106/23; 106/22; 8/509; 8/521
[58] Field of Search ................... 106/23; 260/161, 144, 260/152, 154, 163, 180, 192, 208; 8/509, 521

[56] References Cited

U.S. PATENT DOCUMENTS 4,229,344 10/1980 Muller et al. .......................... 106/23
4,288,362 9/1981 Rolf et al. .............................. 106/23
4,302,388 11/1981 Hunger et al. ........................ 106/23
4,302,389 11/1981 Hunger et al. ........................ 106/23
4,392,999 7/1983 Muller et al. .......................... 106/23

Primary Examiner—John Kight, III
Assistant Examiner—Amelia B. Yarbrough
Attorney, Agent, or Firm—Harry Falber

[57] ABSTRACT

A process for producing monoazo or disazo pigments, which process comprises:
(a) adding to a solution of a diazonium and/or tetrazonium salt of an aromatic or heterocyclic amine a solution or suspension containing 0.1–50% by weight of the theoretically required total weight of one or more coupling components, and
(b) using the product from step (a) as an additive in the production of a monoazo pigment, a disazo pigment or a mixture of monoazo and disazo pigments.

Compared with products produced by conventional methods, the pigments produced in the manner described above have a greater coloring strength, improved transparency, improved flow properties, and a higher degree of dispersibility.

13 Claims, No Drawings

PRODUCTION OF PIGMENTS

This is a divisional of application Ser. No. 203,940 filed on Nov. 4, 1980, now U.S. Pat. No. 4,341,701.

The present invention relates to a process for the production of pigments, especially to a process for producing monoazo or disazo pigments by a modified coupling technique.

Azo pigments are conventionally produced by one of the following two techniques:

(1) Addition of a solution of a diazonium salt or a tetrazonium salt of a suitably substituted aromatic amine or -diamine to a solution or a fine suspension of the coupling component; and (2) Simultaneous addition of (i) a solution of a diazonium salt or a tetrazonium salt of a suitably substituted aromatic amine or -diamine and (ii) a solution or suspension of a coupling component to a buffer solution of the required pH value.

A third technique which can be used is:

(3) Addition of a solution or suspension of a coupling component to a solution of a diazonium salt or a tetrazonium salt of a suitably substituted aromatic amine or -diamine. When this third process is used to produce a disazo pigment by coupling a solution of a tetrazonium salt of a suitably substituted benzidine derivative with an acetoacetarylamide coupling component, the resulting pigmentary products tend to yield dirty albeit strong prints.

We have now developed a modified coupling technique which provides pigments which exhibit clean colourations having improved strength, transparency and dispersibility properties, relative to pigments produced by conventional methods. A particular advantage of the products of the new process is that they have high colour strength, while retaining a good degree of crystallinity.

The present invention relates to a process for producing monoazo or disazo pigments, which process comprises (a) adding to a solution of a diazonium and/or tetrazonium salt of an aromatic or heterocyclic amine a solution or suspension containing 0.1–50% by weight of the theoretically required total weight of one or more coupling components, and (b) completing the coupling reaction by adding the partially coupled product obtained according to step (a) to a solution or suspension of one or more coupling components identical to or different from those used in step (a).

The parameters to be selected for the present process, such as pH value, temperature, and so forth, are known to one skilled in the art, since the conditions for the process do not differ from those suitable for conventional coupling reactions.

The coupling components used in step (b) are preferably the same as those used in step (a).

In a preferred embodiment of the process, 0.1% and especially 1–30% of the theoretically required amount of coupling component is used in step (a). Less pure final products are as a rule obtained when higher amounts are used.

The partially coupled diazonium or tetrazonium salt obtained in step (a) can be further processed directly as a solution or suspension, or can if required be isolated and optionally purified before step (b) is performed.

The process is excellently suitable in particular for coupling tetrazonium salts.

Whilst we would not wish to be limited to any particular reaction mechanism, it is believed that, in the cases of coupling between 3,3'-dichlorobenzidine(DCB) and acetoacetylarylamides (AAA), the reaction mechanism in step (a) of the process may be that represented by the scheme:

(a) 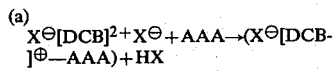

(b) 

wherein $X^\ominus$ is the anion of the appropriate 3,3'-dichlorobenzidine tetrazonium salt.

While the intermediate, mono-coupled products designated $X^\ominus[DCB]^\oplus$—AAA are not new, having been described in British Patent Specification No. 908,202, the present invention offers a novel, much simpler, more direct method of synthesis. Moreover, there is no indication in Specification 908,202 that the intermediate, mono-coupled product can be used to produce pigments of enhanced properties.

In an embodiment of the process of the invention, pigments of enhanced properties may be obtained by the use of different coupling components in stage (a) and (b), respectively, of the process. Thus, e.g. a suspension or solution of a first coupling may be used in step (a) and this product may be subsequently added to a solution or suspension of a different coupling component in step (b). In a further variation the product derived from a single coupling component from step (a) may be added to a solution or suspension of two or more suitable coupling components in step (b). In a still further modification, two or more coupling components may be used in step (a) and the product so obtained may be added then to a solution or suspension of one or more suitable coupling components in step (b).

In a still further embodiment of the process of the invention, pigments of enhanced properties may be produced by employing the product from step (a) of the present process, as an additive in the production of azo pigments. Thus, for example, the product from step (a) may be added to a solution or suspension of a diazonium salt or tetrazonium salt, which may be then coupled with a coupling component (or mixture of coupling components), in a conventional manner. The coupling component so used may be the same as, or different from the coupling component used to form the product of step (a) of the present process. Alternatively, the product of step (a) may be added to a solution or suspension containing an excess of a coupling component which may be the same as, or different from that used in step (a), or may be a mixture of coupling components; the mixture so formed is allowed to react and the excess coupling component may be coupled by the addition of a solution or suspension of a suitable diazonium salt or tetrazonium salt.

Examples of tetrazonium salts which may be used singly or in admixture in the process of the present invention are those prepared by the tetrazotisation of suitable benzidine derivatives such as 3,3'-dichlorobenzidine, orthodianisidine, tetrachlorobenzidine, dinitrobenzidine, orthotolidine or benzidine-2,2'-disulphonic acid. The preferred tetrazonium salt is that derived from 3,3'-dichlorobenzidine. Examples of suitable diazonium compounds are those prepared by the diazotisation of aniline derivatives such as aniline substituted by one or more groups e.g. alkyl, aryl, arylalkyl, nitro, halogen (e.g. chlorine or bromine), alkoxy, aryloxy or heterocyclic amine derivatives such as those commonly used as the diazonium compound in the preparation of azo compounds.

Also suitable as diazonium compounds are those prepared by the diazotisation of aniline derivatives substituted with one or more water solubilising groups, such as sulphonic acid residues or carboxylic acid residues, which may be rendered insoluble after coupling by the addition of suitable elements or combinations of elements cpable of forming a cation. Examples of such aniline derivatives are B-acid, (2-chloro-5-aminobenzene sulphonic acid), 2B-acid (2-amino-4-chloro-5-ethylbenzene sulphonic acid), 4B-acid(2-amino-5-methylbenzene sulphonic acid), C-acid (2-amino-4-methyl-5-chlorobenzene sulphonic acid) and orthonitroaniline parasulphonic acid.

Examples of coupling components useful in the process of the present invention include those of the acetoacetic acid arylamide series, either unsubstituted or substituted with one or more groups such as aryl, alkyl, arylalkyl, alkoxy, aryloxy, halogen (e.g. chlorine or bromine), amide, imide, ester, acid or nitro groups or acetoacetarylamide derivatives of optionally suitably substitute heterocyclic amine-containing compounds such as those commonly used for the production of azo pigments.

Examples of such coupling components are e.g. acetoacetylaminobenzene, 2-acetoacetylaminotoluene, 4-acetoacetylaminotoluene, 2-acetoacetylaminoanisole, 4-acetoacetylaminoanisole, 2-acetoacetylaminophenetole, 4-acetoacetylaminophenetole, 1-acetoacetylamino-2,4-dimethylbenzene, 1-acetoacetylamino-2,4-dimethoxybenzene, 1-acetoacetylamino-2,5-dimethoxybenzene, 1-acetoacetylamino-2,5-dichlorobenzene, 1-acetoacetylamino-2,5-dimethoxy-4-chlorobenzene, 5-chloro-2-acetoacetylaminotoluene, 3-chloro-4-acetoacetylamino toluene, 1-acetoacetylaminonaphthalene, 2-acetoacetylaminonaphthalene, 5-acetoacetylaminobenzimidazolone and 5-acetoacetylamino-6-methylbenzimidazolone.

Examples of coupling components useful in the process of the present invention include those of the pyrazolone series e.g. 1-phenyl-3-methylpyrazol-5-one, 1-(p-tolyl)-3-methylpyrazol-5-one and 1-phenyl-3-ethoxycarbonylpyrazol-5-one.

Further suitable pyrazolone coupling components include 1-arylpyrazol-5-ones in which the aryl group is phenyl, optionally substituted by one or more groups e.g. halogen atoms or 1–4C alkyl or alkoxy groups; or the aryl group is derived from 1-amino-naphthalene or 2-aminonaphthalene.

Other suitable coupling components are 1-naphthol and 2-naphthol and halogen- and carboxy-substituted derivatives thereof.

The process of the present invention can be used to prepare monoazo and disazo pigments such as those which have commercial importance in the ink, paint and plastics industries.

When the process is used to produce monoazo pigments, such commercially important pigments include those of the Hansa Yellow type produced by coupling suitably substituted aromatic amines with acetoacetanilide derivatives. Other commercially important monoazo pigments which may be produced with advantage are those derived from the same diazo components used for the Hansa Yellow pigments but using coupling components of the hydroxy-naphthalene series e.g. β-naphthol and substituted amide derivatives of β-oxynaphthoic acid and, β-oxynaphthoic acid itself; and derivatives e.g. salts, of these pigments.

When the process of the invention is used to produce disazo pigments, such commercially important pigments include those obtained by coupling tetrazotised dichlorobenzidine derivatives with acetoacetanilide derivatives, optionally substituted pyrazolone derivatives or β-oxynaphthoic acid amide derivatives.

The products of the process of the invention are distinguished by their superior properties such as strength transparency, flow, cleanliness and dispersibility, relative to products, having the same constitution but prepared by conventional methods, irrespective of whether the latter products are individual pigments or mixtures of pigments.

The properties of the pigments produced by the present process can be further improved by means of treatments known per se. Such aftertreatments are for example:

(i) Addition of a water-soluble dye, for example a water-soluble monoazo dye, of a diphenylchrysoine, in particular however of a diarylide dye. This technique is known for example from the U.S. Pat. No. 3,776,749, wherein likewise the methods of incorporation are described in detail. Especially valuable water-soluble dyes can be produced by coupling of a tetrazotised benzidine, rendered in a suitable manner soluble in water, with a coupling component, such as an acetoacetanilide or pyrazolone, which contains no water-solubilising groups; or by coupling of a tetrazotised benzidine with a coupling component which contains water-solubilising groups; or, finally, by coupling of a tetrazotised benzidine with a coupling component where both components contain water-solubilising groups. By water-solubilising groups are meant groups such as sulfonic acid and carboxylic acid groups and water-soluble metal salts thereof, amino groups and water-soluble salts of amino groups, for example those which are formed with aliphatic acids. The free acids of the dyes can be produced for example by boiling of the sodium salts of the dyes which are obtained in the coupling reactions in hydrochloric acid. Thus for example the pigment could be an acetoacet-o-toluidide coupled with tetrazo-3,3'-dichlorobenzidine, and the soluble dye could be acetoacetanilide coupled with tetrazo-4,4'-diamino-2,2'-biphenyldisulfonic acid; alternatively, the pigment could be acetoacet-m-xylidide coupled with tetrazo-3,3'-dichlorobenzidine and the soluble dye could be acetoacet-m-xylidide coupled with tetrazo-4,4'-diamino-2,2'-diphenyldisulfonic acid. Also mixtures of soluble dyes can be used.

The sulfonated or carboxylated benzidines which can be used according to the invention can be mono- or disubstituted, or can contain more than two acid groups. Very suitable benzidines are disubstituted, that is to say, they are those compounds which carry as substitutents a sulfonic acid group or a carboxylic acid group on each aromatic nucleus.

The adsorbed soluble dye can if required be rendered in a later stage insoluble, for example by the formation of insoluble salts with metals of the groups IA, IB, IIA, IIB, IIIA, IIIB and VIII of the periodic system. Examples of water-soluble dyes of this type are given in the U.S. Pat. No. 3,776,749.

In general there is added up to 25% by weight of the soluble dye, relative to the pigment or pigment mixture produced according to the invention, preferably however 1 to 10% by weight is added.

(ii) Aftertreatment with a solvent: suitable solvents are in particular polar aliphatic solvents, which are at least partially miscible with water, for example $C_1$–$C_4$-alcohols, short-chain monocarboxylates, lower alkyl ketones or short-chain alkoxyalkanols or glycols. The solvent aftertreatment of pigments is described in detail in the U.S. Pat. No. 3,532,030.

(iii) Subsequent heat treatment of the pigments produced by the process according to the invention, under acidic, basic or neutral conditions.

(iv) Aftertreatment of the pigments, produced by the process according to the invention, with long-chain alcohols, esters, amines or amides, or with uncharged, cationic or anionic surface-active agents, and also with resin-like substances.

The isolation of the pigments produced according to the invention is performed in the usual manner, for example by filtration and washing and drying of the residue. For certain applications, there are of course other suitable methods, for example the processing of the filter residue into the form of an aqueous paste, or taking it up in an organic solvent. The pigments can if desired be ground, or granulated together with auxiliaries, as described for example in the G.B. Patent Specification Nos. 2,009,204 and 2,036,057 A).

The compounds produced according to the invention display the stated advantages in the widest range of media to be dyed: such as in paints, plastics and particularly printing inks, for example liquid printing inks and also packaging gravure-printing inks, which are based for example on nitrocellulose or alkyd resins, also gravure-printing pastes and inks having an oil base, for lithographic and letterpress printing purposes.

Percentage values in the following Examples are percent by weight.

EXAMPLE 1

A tetrazonium salt solution was prepared by stirring to a smooth paste 32.6 parts of 3,3'-dichlorobenzidine dihydrochloride in 250 parts of water containing 40 parts of concentrated hydrochloric acid (specific gravity=1.18) and then tetrazotising with 13.8 parts of sodium nitrite dissolved in 25 parts of water, whilst maintaining the temperature between 0° and 5° C. The tetrazonium salt solution was clarified by adding 1 part of activated charcoal and subsequently filtering. The final volume of the tetrazonium salt solution was adjusted to 800 parts with water at a temperature between 0° and 5° C.

The suspension of coupling component was prepared by dissolving 43 parts of 1-acetoacetylamino-2,4-dimethylbenzene and 9.2 parts of sodium hydroxide in 160 parts of water and then adding to this, slowly, a solution of 18 parts of glacial acetic acid in 350 parts of water, whilst stirring vigorously.

The pH value of the tetrazonium salt solution was adjusted to 4.0 by the gradual addition of sodium acetate trihydrate, whilst still maintaining the temperature between 0° and 5° C. Then 10% of the coupling component suspension was added slowly to the stirred tetrazonium salt solution, and the resulting mixture was stirred for a further 10 minutes before being added to the remainder of the coupling component suspension over 50 minutes, with vigorous stirring of the coupling component suspension to ensure that there was never an excess of tetrazonium salt in the coupling liquor. Throughout the coupling reaction, the temperature was maintained between 15° and 20° C. and the pH was maintained between 4.7 and 6.5 by adding a 10% solution of sodium hydroxide, as required.

After completion of this coupling reaction, the pH value of the slurry was adjusted to 6.0 by addition from a 10% solution of sodium hydroxide, and the whole heated to 95° C. by feeding in steam, and was maintained at this temperature for 60 minutes. The slurry was then cooled to 70° C. by addition of cold water, and filtered under suction and washed with water on the filter until the filtrate contained no detectable chloride ions. The product was dried at 50° to 55° C. and then ground to produce a yellow pigment.

The product so obtained, when incorporated into an oil ink varnish, exhibited 15% higher colouring strength than a product which had been incorporated by the same method into the same oil ink varnish but which had been prepared by a conventional coupling of tetrazotised 3,3'-dichlorobenzidine and 1-acetoacetylamino-2,4-dimethylbenzene. In this conventional coupling, none of the coupling component suspension was added to the tetrazonium salt solution, but instead, a tetrazonium salt solution was prepared in the manner described in Example 1 and added over 50 minutes at a pH between 4.7 and 6.5 and at a temperature between 15° and 20° C., to a coupling component suspension prepared in the manner described in Example 1 and wherein the resultant slurry was heated and the product isolated, dried and ground in the manner described for the product of Example 1.

The product of Example 1, when incorporated into a liquid packaging ink also exhibited markedly superior gloss and transparency when compared with a similarly produced ink at equal viscosity but which contained a product which had been prepared by a conventional coupling of tetrazotised 3,3'-dichlorobenzidine and 1-acetoacetylamino-2,4-dimethylbenzene(as described previously).

EXAMPLE 2

A product was prepared using the same reactants, reaction conditions and methods as those described in Example 1 except that 20% of the coupling component suspension was added to the tetrazonium salt solution. The product so obtained possessed similar excellent properties to those of the product of Example 1.

EXAMPLE 3

A product was prepared using the same reactants, reaction conditions and methods as those described in Example 1 except that 30% of the coupling component suspension was added to the tetrazonium salt solution. The product so obtained possessed similar excellent properties to those of the product of Example 1.

EXAMPLE 4

The tetrazonium salt solution was prepared and clarified by the method described in Example 1. The suspension of 1-acetoacetylamino-2,4-dimethylbenzene, the coupling component, was prepared by the method described in Example 1.

The pH of the tetrazonium salt solution was adjusted to 4.0 by the gradual addition of sodium acetate trihydrate whilst still maintaining the temperature between 0° and 5° C. Then 10% of the coupling component suspension was added slowly to the stirred tetrazonium salt solution. The resulting partially coupled mixture was stirred for 10 minutes before the insoluble material was separated from the tetrazonium salt solution by filtration under vacuum. This insoluble material was then added to the vigorously stirred remainder of the coupling component suspension. The remainder of the tetrazonium salt solution (that is after removal of the insoluble material), still maintained at a temperature between 0° and 5° C., was then added to the coupling component suspension over 50 minutes, with vigorous stirring of the coupling component suspension, to ensure that there was never an excess of tetrazonium salt in the coupling liquor. Throughout the coupling reaction the temperature of the coupling liquor was maintained between 15° and 20° C. and the pH value was maintained between 4.7 and 6.5 by adding from a 10% solution of sodium hydroxide as required.

After completion of this coupling reaction, the pH value of the slurry was adjusted to 7.0 by addition from a 10% solution of sodium hydroxide, 20.5 Parts of the hydrogenated abietic acid, sold under the Trade Mark "Staybelite Resin", dissolved in 200 parts of water at 95° C. containing 2.5 parts of sodium hydroxide were allowed to cool to 40° C. and were added to the stirred pigment slurry. The whole was heated to 95° C. by feeding in steam and was maintained at this temperature for 60 minutes. The pH value of this slurry was then reduced to 6.0 by the gradual addition of a 2N solution of hydrochloric acid. After a further 10 minutes the temperature of the slurry was reduced to 70° C. by addition of cold water and then filtered under suction and washed with water on the filter until the filtrate contained no detectable chloride ions. The product was dried at 50°-55° C. and then ground to produce a yellow pigment.

The product so obtained, when incorporated into an oil ink varnish, exhibited 10% higher colouring strength than a product which had been incorporated by the same method into the same oil ink varnish but which had been prepared by a conventional coupling of tetrazotised 3,3'-dichlorobenzidine and 1-acetoacetylamino-2,4-dimethylbenzene(as described for the conventional coupling procedure in Example 1) and subsequently resinated, isolated, dried and ground in the same manner as that described for the product of Example 4.

EXAMPLE 5

The tetrazonium salt solution was prepared and clarified as in Example 1 and was maintained at a pH value of less than 1.0 and at a temperature between 0° and 5° C. and had a final volume of 800 parts. To this solution was added 1.37 parts of the nonionic surface active agent sold under the Trade Mark "Cirrasol ALN-WF" (a condensate of fatty alcohol with ethylene oxide).

The suspension of 1-acetoacetylamino-2,4-dimethylbenzene, the coupling component, was prepared by the method described in Example 1.

10% of the coupling component suspension was added slowly to the stirred tetrazonium salt solution and the mixture was stirred for a further 30 minutes. To the remainder of the stirred coupling component suspension was added 100 parts of sodium acetate trihydrate. Then, over a period of 50 minutes, the tetrazonium salt solution containing the small proportion of added coupling component was added to the remainder of the coupling component suspension, with vigorous stirring of the coupling component suspension to ensure that there was never an excess of tetrazonium salt in the coupling liquor. Throughout the coupling reaction the temperature was maintained between 15° and 20° C. and the pH was maintained between 4.7 and 6.5 by adding from a 10% solution of sodium hydroxide, as required.

A solution was prepared which, in 160 parts of water at 70° C., contained 1.3 parts of the water-soluble dyestuff produced by the coupling reaction between tetrazotised benzidine-2,2'-disulphonic acid and 1-acetoacetylamino-2,4-dimethylbenzene. This solution of the water-soluble dyestuff was added to the coupled pigment slurry, and the pH value of the whole was raised to 7.0 by addition of a 10% solution of sodium hydroxide. To this slurry of pigment and dyestuff was added a solution containing 13.7 parts of the hydrogenated abietic acid, sold under the Trade Mark "Staybelite Resin", which had been dissolved in 320 parts of water at 95° C. containing 2.0 parts of sodium hydroxide, and which was subsequently allowed to cool to 40° C.

This slurry was heated to 95° C. by feeding in steam and was maintained at this temperature for 60 minutes. The pH value of the slurry was reduced to 6.0 by the gradual addition of a 2N solution of hydrochloric acid. After a further 15 minutes, the temperature of the slurry was reduced to 70° C. by the addition of cold water and then filtered under suction and washed with water on the filter until the filtrate contained no detectable chloride ions. The product was dried at 50°-55° C. and then ground to produce a yellow pigment.

The product so obtained, when incorporated into an oil ink varnish or a liquid packaging ink, exhibited 15% higher colouring strength than a product which had been incorporated by the same methods into the same ink systems, but which had been prepared by a conventional coupling of tetrazotised 3,3'-dichlorobenzidine and 1-acetoacetylamino-2,4-dimethylbenzene (as described for the conventional coupling procedure in Example (1) and which was subsequently treated with the same amount of the same water soluble dyestuff and resinated, isolated, dried and ground in the same manner as that described for the product of Example 5.

Similar results were obtained when "Cirrasol ALN-WF" was replaced by other surfactants of fatty alcohol-/alkylene oxide or alkylphenol/alkylene oxide types.

EXAMPLE 6

The tetrazonium salt solution was prepared and clarified as described in Example 1 and was maintained at a pH of less than 1.0 and at a temperature between 0° and 5° C. and with a final volume of 800 parts. To this solution was added 1.37 parts of the nonionic surface active agent sold under the Trade Mark "Cirrasol ALN-WF" (a condensate of fatty alcohol with ethylene oxide).

The suspension of 1-acetoacetylamino-2,4-dimethylbenzene, the coupling component, was prepared by a method described in Example 1.

5% of the coupling component suspension was added slowly to the tetrazonium salt solution and the mixture stirred for 30 minutes. Then, over a period of 50 minutes, the tetrazonium salt solution, containing the small proportion of added coupling component, was added to the remainder of the coupling component suspension with vigorous stirring of the coupling component suspension to ensure that there was never an excess of tetrazonium salt in the coupling liquor. Throughout the coupling reaction the temperature was maintained between 15° and 20° C. and the pH value was maintained between 4.7 and 6.5 by adding from a 10% solution of sodium hydroxide, as required.

To this slurry was added a solution of water-soluble dyestuff as described in Example 5 and the whole was then treated with resin and heated and the product isolated, dried and ground as described in Example 5.

The product so obtained had similar excellent properties to the product of Example 5.

EXAMPLE 7

The tetrazonium salt solution was prepared and clarified by the method described in Example 1 and was maintained at a pH of less than 1.0 and at a temperature between 0° and 5° C. and with a final volume of 800 parts. To this solution was added a solution containing 1.5 parts of the nonionic surface active agent sold under the Trade Mark" Cirrasol ALN-WF" (a condensate of fatty alcohol with ethylene oxide) dissolved in 50 parts of water. The suspension of the coupling component, was prepared by dissolving 37.2 parts of acetoacetanilide and 9.21 parts of sodium hydroxide in 300 parts of water, reducing the temperature to between 0° and 5° C. with ice and then adding dropwise, with vigorous stirring, a solution containing 15.0 parts of glacial acetic acid in 360 parts of water. The temperature of the suspension was allowed to rise to between 15° and 20° C.

10% of the coupling component suspension was added slowly to the stirred tetrazonium salt solution and the mixture stirred for a further 10 minutes. To the remainder of the coupling component suspension was added 100 parts of sodium acetate trihydrate. Then, over a period of 50 minutes, the tetrazonium salt solution containing the small proportion of added coupling component was added to the remainder of the coupling component suspension with vigorous stirring of the coupling component suspension to ensure that there was never an excess of tetrazonium salt in the coupling liquor. Throughout the coupling reaction, the temperature was maintained between 15° and 20° C. and the pH value was maintained between 4.7 and 6.5 by adding from a 10% solution of sodium hydroxide, as required.

After completion of this coupling reaction, the pH of the slurry was raised to 7.0 by adding from a 10% solution of sodium hydroxide. To the slurry was added a solution containing 12.6 parts of the hydrogenated abietic acid sold under the Trade Mark "Staybelite Resin" which had been dissolved in 300 parts of water at 95° C. containing 1.5 parts of sodium hydroxide and which was subsequently allowed to cool to 40° C.

This slurry was heated to 95° C. by feeding in steam and was maintained at this temperature for 60 minutes. The pH value of the slurry was reduced to 6.0 by the gradual addition of a 2N solution of hydrochloric acid. After a further 15 minutes, the temperature of the slurry was reduced to 70° C. by the addition of cold water and then filtered under suction and washed with water on the filter until the filtrate contained no detectable chloride ions. The product was dried at 50°-55° C. and then ground to produce a yellow pigment.

The product so obtained, when incorporated into an oil ink varnish, exhibited 15% higher colouring strength and markedly superior transparency than a product which had been incorporated by the same method into the same oil ink varnish but which had been prepared by a conventional coupling tetrazotised 3,3'-dichlorobenzidine and acetoacetanilide (that is in which none of the coupling component suspension was added to the tetrazonium salt solution, but instead in which a tetrazonium salt solution was prepared in the manner described in Example 1 and added over 50 minutes at a pH between 4.7 and 6.5 and at a temperature between 15° and 20° C. to a coupling component suspension prepared in the manner described in Example 7) and wherein the resultant slurry was resinated and heated and the product isolated, dried and ground in the manner described for the product of Example 7.

EXAMPLE 8

The tetrazonium salt solution was prepared and clarified by the method described in Example 1 and maintained at a pH value of less than 1.0 and at a temperature between 0° and 5° C. and with a final volume of 800 parts.

The suspension of the coupling component was prepared by dissolving 40.2 parts of 2-acetoacetylaminotoluene and 9.21 parts of sodium hydroxide in 300 parts of water, reducing the temperature to between 0° and 5° C. with ice and then adding dropwise, with vigorous stirring, a solution containing 15.0 parts of glacial acetic acid in 360 parts of water. The temperature was allowed to rise to between 15° and 20° C., and then a solution containing 1.5 parts of the nonionic surface active agent sold under the Trade Mark "Cirrasol ALN-WF" (a condensate of fatty alcohol with ethylene oxide) dissolved in 50 parts of water, was added. 10% of the coupling component suspension was added slowly to the stirred tetrazonium salt solution and the mixture stirred for a further 10 minutes. 100 parts of sodium acetate trihydrate were added to the remainder of the coupling component suspension and then the coupling reaction carried out by the method described in Example 7. After completion of the coupling reaction, the pH of the slurry was raised to 7.0 by adding from a 10% solution of sodium hydroxide. To the slurry was added a solution containing 13.2 parts of the hydrogenated abietic acid sold under the Trade Mark "Staybelite Resin" which had been dissolved in 300 parts of water at 95° C. containing 1.65 parts of sodium hydroxide and which was subsequently cooled to 40° C. This slurry was then heated and its pH adjusted and the product isolated, dried and ground by the method described in Example 7.

The product so obtained, when incorporated into an oil ink varnish exhibited 10% higher colouring strength and better transparency than a product which had been incorporated by the same method into the same oil ink varnish but which had been prepared by a conventional coupling of tetrazotised 3,3'-dichlorobenzidine and 2-acetoacetylaminotoluene (that is in which none of the coupling component suspension was added to the tetrazonium salt solution, but instead in which a tetrazonium salt solution was prepared in the manner described in Example 1 and added over 50 minutes at a pH between 4.7 and 6.5 and at a temperature between 15° and 20° C. to a coupling component suspension prepared in the manner described in Example 8) and wherein the resultant slurry was resinated in the manner described in Example 8 and then heated and the product isolated, dried and ground in the manner described for the product of Example 7.

EXAMPLE 9

The tetrazonium salt solution was prepared and clarified by the method described in Example 1 and was maintained at a pH of less than 1.0 and at a temperature between 0° and 5° C. and with a final volume of 800 parts.

The suspension of the coupling component was prepared by dissolving 43.5 parts of 2-acetoacetylaminoanisole and 9.21 parts of sodium hydroxide in 300 parts of water, reducing the temperature to between 0° and 5° C. with ice and then adding dropwise, with vigorous stirring, a solution containing 15.0 parts of glacial acetic acid in 360 parts of water. The temperature was allowed to rise to between 15° and 20° C. and then a solution containing 1.5 parts of the non-ionic surface active agent sold under the Trade Mark "Cirrasol ALN-WF" (a condensate of fatty alcohol with ethylene oxide) was added.

10% of the coupling component suspension was added slowly to the stirred tetrazonium salt solution and the mixture stirred for a further 10 minutes. 100 parts of sodium acetate trihydrate were added to the remainder of the coupling component suspension and then the coupling reaction carried out by the method described in Example 7. After completion of the coupling reaction, the pH of the slurry was raised to 7.0 by adding from a 10% solution of sodium hydroxide. To the slurry was added a solution containing 13.8 parts of the hydrogenated abietic acid sold under the Trade Mark "Staybelite Resin" which had been dissolved in 300 parts of water at 95° C. containing 1.65 parts of sodium hydroxide and which was subsequently cooled to 40° C. This slurry was then heated and its pH adjusted and the product isolated, dried and ground by the method described in Example 7.

The product so obtained, when incorporated into an oil ink varnish, exhibited 5% higher colouring strength than a product which had been incorporated by the same method into the same oil ink varnish but which had been prepared by a conventional coupling of tetrazotised 3,3'-dichlorobenzidine and 2-acetoacetylaminoanisole (that is in which none of the coupling component suspension was added to the tetrazonium salt solution but instead in which a tetrazonium salt solution was prepared by the method described in Example 1 and added over 50 minutes at a pH between 4.7 and 6.5 and at a temperature between 15° and 20° C. to a coupling component suspension prepared in the manner described in Example 9) and wherein the resultant slurry was resinated in the manner described in Example 9 and then heated and the product isolated, dried and ground in the manner described for the product of Example 7.

EXAMPLE 10

The tetrazonium salt solution was prepared by stirring to a smooth paste 25.26 parts of 3,3'-dichlorobenzidine dihydrochloride in 150 parts of water containing 34.0 parts of hydrochloric acid (specific gravity=1.18) and then tetrazotising in the usual manner with 10.3 parts of sodium nitrite dissolved in 20 parts of water, all the while maintaining the temperature between 0° and 5° C. the tetrazonium salt solution was clarified by adding 1 part of activated charcoal and subsequently filtering. The final volume of the tetrazonium salt solution was adjusted to 360 parts with water at a temperature between 0° and 5° C.

The solution of coupling component was prepared by dissolving 29.14 parts of 1-(p-tolyl)-3-methylpyrazol-5-one in 210 parts of water containing 7.2 parts of sodium hydroxide.

A solution containing 1.25 parts of the nonionic surface agent sold under the Trade Mark "Cirasol ALN-WF" dissolved in 25 parts of water was added to the tetrazonium salt solution. Then 10% of the coupling component solution was added slowly to the stirred tetrazonium salt solution and stirred for a further 10 minutes.

In a coupling vessel 1.75 parts of sodium acetate were dissolved in 500 ml water and 2.3 parts of precipitated chalk added. The pH was adjusted to between 5.5 and 5.7 with a 2N solution of hydrochloric acid and then 5% of the remainder of the coupling component solution was added dropwise, maintaining the pH between 5.5 and 5.7 by adding from a 2N solution of hydrochloric acid. Subsequently, the remainder of the coupling component solution and the tetrazonium salt solution containing a small proportion of added 1-(p-tolyl)-3-methylpyrazol-5-one were added simultaneously to the coupling vessel over 90 minutes, with vigorous stirring to ensure that there was never an excess of tetrazonium salt in the coupling liquor. Throughout the coupling reaction the temperature was maintained between 15° and 20° C. and the pH was maintained between 3.5 and 5.7 by adding from either a 2N solution of hydrochloric acid or a 10% solution of sodium hydroxide, as required.

After completion of this coupling reaction, the pH of the slurry was reduced to 4.0 by adding from a 2N solution of hydrochloric acid and the slurry then heated to 95° C. by feeding in steam. The slurry was filtered under suction and washed with water on the filter until the filtrate contained no detectable chloride ions. The product was dried at 55°–60° C. and then ground to produce an orange pigment.

The product so obtained, when incorporated into an oil ink varnish, exhibited 13% higher colouring strength and better transparency than a product which had been incorporated by the same method into the same oil ink varnish but which had been prepared by a conventional coupling of tetrazotised 3,3'-dichlorobenzidine and 1-(p-tolyl)-3-methylpyrazol-5-one (that is in which none of the coupling component solution was added to the tetrazonium salt solution but instead in which a tetrazonium salt solution and a coupling component solution were prepared in the manner described in Example 10 and were then added simultaneously to a buffer solution over 90 minutes, at a temperature between 15° and 20° C., at a pH between 5.5 and 5.7 during which time there was never an excess of tetrazonium salt in the coupling liquor and the slurry so produced was heated and the product isolated, dried and ground in the manner described for the product of Example 10).

EXAMPLE 11

The tetrazonium salt solution was prepared and clarified as described in Example 1 and was maintained at a pH of less than 1.0 and at a temperature between 0° and 5° C. and with a final volume of 800 parts. To this solution was added 1.36 parts of the nonionic surface active agent sold under the Trade Mark "Cirrasol ALN-WF".

A suspension of the first coupling component was prepared by dissolving 4.36 parts of 1-acetoacetylamino-2,4-dimethylbenzene and 0.98 parts of sodium hydroxide in 140 parts of water, and then slowly adding a 20% solution of glacial acetic acid in water, whilst stirring vigorously, until the pH was reduced to 6.0. This suspension of 1-acetoacetylamino-2,4-dimethylbenzene was then added slowly, and with vigorous stirring, to the solution of the tetrazonium salt solution, and the mixture stirred for 30 minutes.

A suspension of the second coupling component was prepared by dissolving 39.9 parts of 1-acetoacetylamino-2-chlorobenzene in 200 parts of water containing 10.1 parts of sodium hydroxide, and then slowly adding a 20% solution of glacial acetic acid in water until the pH was reduced to 6.0, all the time stirring vigorously.

Over a period of 50 minutes, the tetrazonium salt solution containing the small proportion of added 1-acetoacetylamino-2,4-dimethylbenzene coupling component was added to the suspension of the second coupling component, 1-acetyacetylamino-2-chlorobenzene, with vigorous stirring of the resulting mixture to ensure that there was never an excess of tetrazonium salt in the coupling liquor. Throughout the coupling reaction the temperature was maintained between 15° and 20° C. and the pH was maintained between 4.7 and 6.0 by adding from a 10% solution of sodium hydroxide as required.

After completion of this coupling reaction the pH of the slurry was adjusted to 6.5 by adding from a 10% solution of sodium hydroxide, and the whole heated to 95° C. by feeding in steam, and was maintained at this temperature for 60 minutes. The slurry was then filtered under suction and washed with water on the filter until the filtrate contained no detectable chloride ions. The product was dried at 50°–55° C. and then ground to produce a yellow pigment.

The product so obtained, when incorporated into an oil ink varnish, exhibited markedly superior transparency than a product which had been incorporated by the same method into the same oil ink varnish but which had been prepared by a conventional coupling of tetrazotised 3,3'-dichlorobenzidine and a mixture containing the same proportions of 1-acetoacetylamino-2-chlorobenzene and 1-acetoacetylamino-2,4-dimethylbenzene as those described in this Example (i.e. in which no coupling component was added to the tetrazonium salt solution; but instead in which the two coupling component suspensions were prepared in the manner described in Example 11, and mixed together, and then to this mixture was added, at a pH between 4.7 and 6.0, at a temperature between 15° and 20° C. and over a period of 50 minutes, a tetrazonium salt solution prepared in the manner described in Example 1) and wherein the resultant slurry was heated and the product isolated, dried and ground in the manner described for the product of Example 11.

EXAMPLE 12

The tetrazonium salt solution was prepared and clarified as described in Example 1 and was maintained at a pH of less than 1.0 and at a temperature between 0° and 5° C. and with a final volume of 800 parts. To this solution was added 1.36 parts of the nonionic surface active agent sold under the Trade Mark "Cirrasol ALN-WF".

A suspension of the first coupling component 1-acetoacetylamino-2,4-dimethylbenzene was prepared and added to the solution of the tetrazonium salt in the manner described in Example 11.

A suspension of the second coupling component was prepared by dissolving 36.1 parts of 4-acetoacetylaminotoluene in 200 parts of water containing 9.14 parts of sodium hydroxide and then slowly adding a 20% solution of glacial acetic acid in water until the pH was reduced to 6.0, all the time stirring vigorously.

Over a period of 50 minutes, the tetrazonium salt solution containing the small proportion of added 1-acetoacetylamino-2,4-dimethylbenzene coupling component, was added to the suspension of the second coupling component, 4-acetoacetylaminotoluene with vigorous stirring of the resulting mixture to ensure that there was never an excess of tetrazonium salt in the coupling liquor. Throughout the coupling reaction the temperature was maintained between 15° and 20° C. and the pH was maintained between 4.7 and 6.0 by adding from a 10% solution of sodium hydroxide as required.

After completion of this coupling reaction the pH of the slurry was adjusted, and the whole heated to 95° C., as described in Example 11. The product was isolated, dried and ground as described in Example 11.

The product so obtained, when incorporated into an oil ink varnish, exhibited 10% higher colouring strength than a product which had been incorporated by the same method into the same oil ink varnish but which had been prepared by a conventional coupling of tetrazotised 3,3'-dichlorobenzidine and a mixture containing the same proportions of 4-acetoacetylaminotoluene and 1-acetoacetylamino-2,4-dimethylbenzene as those described in this Example (i.e. in which no coupling component was added to the tetrazonium salt solution but instead in which the two coupling component suspensions were prepared in the manner described in Example 12 and mixed together and then to this mixture was added at a pH between 4.7 and 6.0, at a temperature between 15° and 20° C. and over a period of 50 minutes, to a tetrazonium salt solution prepared in the manner described in Example 1) and wherein the resultant slurry was heated and the product isolated, dried and ground in the manner described for the product of Example 11.

EXAMPLE 13

The tetrazonium salt solution was prepared and clarified as in Example 1 and was maintained at a pH value of less than 1.0 and at a temperature between 0° and 5° C. and had a final volume of 500 parts. To this solution was added a solution containing 1.37 parts of the nonionic surface active agent sold under the Trade Mark "Cirrasol ALN-WF" dissolved in 50 parts of water.

The suspension of coupling component was prepared by, firstly, dissolving 34.4 parts of 1-acetoacetylamino-2,4-dimethylbenzene, 8.7 parts of 2-acetoacetylaminoanisole and 9.21 parts of sodium hydroxide in 500 parts of water at 15° C. and, secondly, adding dropwise and with vigorous stirring a 25% solution of glacial acetic acid in water until the pH was reduced to 6.0.

10% of the coupling component suspension was added slowly to the stirred tetrazonium salt solution and the mixture stirred for a further 30 minutes. Then, over a period of 45 minutes, the tetrazonium salt solution containing the small proportion of added coupling component suspension was added to the remainder of the coupling component suspension with sufficient stirring to ensure that there was never an excess of tetrazonium salt in the coupling liquor. Throughout the coupling reaction the temperature was maintained between 15° and 20° C. and the pH value was maintained between 4.7 and 6.0 by adding from a 10% solution of sodium hydroxide as required.

After completion of this coupling reaction the pH of the slurry was raised to 6.0 by adding from a 10% solution of sodium hydroxide. The slurry was then heated to 95° C. by feeding in steam and was maintained at this temperature for 60 minutes. The temperature of the slurry was then reduced to 70° C. by the addition of cold water and the slurry was filtered under suction and washed with water on the filter until the filtrate contained no detectable chloride ions. The product was dried at 50°–55° C. and ground to produce a yellow pigment.

The product so obtained, when incorporated into an oil ink varnish, exhibited 10% higher colouring strength than a product which had been similarly incorporated into the same oil ink varnish, but which had been prepared by a conventional coupling of tetrazotised 3,3'-dichlorobenzidine with a mixture of 1-acetoacetylamino-2,4-dimethylbenzene and 2-acetoacetylaminoanisole in the same ratio as that used in Example 13 (that is in which none of the coupling component suspension was added to the tetrazonium salt solution, but instead in which a tetrazonium salt solution was prepared in the manner described in Example 1 and added over 45 minutes at a pH between 4.7 and 6.0 and at a temperature between 15° and 20° C. to a coupling component suspension prepared in the manner described in Example 13) and wherein the resultant slurry was heated and the product isolated dried and ground in the manner described in Example 13.

EXAMPLE 14

The tetrazonium salt solution was prepared and clarified as in Example 1 and was maintained at a pH value of less than 1.0 and at a temperature between 0° and 5° C. and had a final volume of 500 parts. To this solution was added a solution containing 1.37 parts of the non-ionic surface active agent sold under the Trade Mark "Cirrasol ALN-WF" dissolved in 50 parts of water.

The suspension of coupling component was prepared as in Example 13, but replacing the 2-acetoacetylaminoanisole with 8.0 parts of 2-acetoacetylaminotoluene.

10% of the coupling component suspension was added slowly to the stirred tetrazonium salt solution and the mixture stirred for a further 30 minutes. Then, over a period of 45 minutes the tetrazonium salt solution containing the small proportion of added coupling component suspension was added to the remainder of the coupling component suspension in the same manner and under the same conditions as described in Example 13.

After completion of this coupling reaction the pH of the slurry was raised to 7.0 by adding from a 10% solution of sodium hydroxide. To the slurry was added a solution containing 13.7 parts of the hydrogenated abietic acid sold under the Trade Mark "Staybelite Resin" which had been dissolved in 300 parts of water at 95° C. containing 1.5 parts of sodium hydroxide and which was subsequently cooled to 40° C. This slurry was heated, its pH adjusted and the product isolated, dried and ground as described in Example 7.

The product so obtained, when incorporated into an oil ink varnish, exhibited 10% higher colouring strength than a product which had been similarly incorporated into the same oil ink varnish, but which had been prepared by a conventional coupling of tetrazotised 3,3'-dichlorobenzidine with a mixture of 1-acetoacetylamino-2,4-dimethylbenzene and 2-acetoacetylaminotoluene in the same ratio as that used in Example 14 (that is in which none of the coupling component suspension was added to the tetrazonium salt solution, but instead in which a tetrazonium salt solution was prepared in the manner described in Example 1 and added over 45 minutes at a pH between 4.7 and 6.0 and at a temperature between 15° and 20° C. to a coupling component suspension prepared in the manner described in Example 14) and wherein the resultant slurry was resinated in the manner described in Example 14 and then heated and the product isolated, dried and ground in the manner described for the product of Example 7.

EXAMPLE 15

A pigment slurry was prepared in the same manner using the same reagents in the same proportions and using the same conditions as described in Example 14. However, in addition at the end of the coupling reaction and after the pH of the slurry had been adjusted to 7.0 a solution was added which contained in 160 parts of water 1.3 parts of the water-soluble dyestuff produced by the coupling reaction between tetrazotised benzidine-2,2'-disulphonic acid and 1-acetoacetylamino-2,4-dimethylbenzene. This slurry was then resinated in the same manner with the same amount of the same resin as described in Example 14 and the slurry then heated, its pH adjusted and the product isolated, dried and ground as described in Example 7.

The product so obtained, when incorporated into an oil ink varnish, exhibited 10% higher colouring strengh than a product which had been similarly incorporated into the same oil ink varnish, but which had been prepared by a conventional coupling of tetrazotised 3,3'-dichlorobenzidine with a mixture of 1-acetoacetylamino-2,4-dimethlybenzene and 2-acetoacetylaminotoluene in the same ratio as that used for the product of Example 15 (that is in which none of the coupling component suspension was added to the tetrazonium salt solution, but instead in which a tetrazonium salt solution was prepared in the manner described in Example 1 and added over 45 minutes at a pH between 4.7 and 6.0 and at a temperature between 15° and 20° C. to a coupling component suspension prepared in the manner described in Example 14) and wherein the resultant slurry was treated in the same manner with the same amount of the same water-soluble dyestuff as described for the product of Example 15, and resinated in the manner described in Example 14 and then heated and the product isolated, dried and ground in the manner described for the product of Example 7.

EXAMPLE 16

A tetrazonium salt solution was prepared by stirring to a smooth paste 17.35 parts of orthodianisidine in 100 parts of water containing 30.0 parts of concentrated hydrochloric acid (specific gravity=1.18) and then tetrazotising with 9.9 parts of sodium nitrite dissolved in 25 parts of water, whilst maintaining the temperature between 0° and 5° C. The tetrazonium salt solution was clarified by adding one part of activated charcoal and subsequently filtering. The final volume of the tetrazonium salt solution was adjusted to 300 parts at a temperature between 0° and 5° C. and to this solution was added a solution containing one part of the nonionic surface active agent sold under the Trade Mark "Cirrasol ALN-WF", dissolved in 50 parts of water.

The suspension of coupling component was prepared by dissolving 30.3 parts of 1-acetoacetylamino-2,4-dimethylbenzene and 7.2 parts of sodium hydroxide in 300 parts of water and then slowly adding to this from a solution of 11.5 parts of glacial acetic acid in 50 parts of water until the pH value was 6.0, while continuously stirring vigorously.

10% of the coupling component suspension was added slowly to the stirred tetrazonium salt solution and the resulting mixture stirred for a further 15 minutes. Then, over a period of 60 minutes, the tetrazonium salt solution containing the small proportion of added coupling component, was added to the remainder of the coupling component suspension with vigorous stirring of the coupling component to ensure that there was never an excess of tetrazonium salt in the coupling liquor. Throughout the coupling reaction the temperature was maintained between 15° and 20° C. and the pH value was maintained between 4.6 and 6.0 by adding a 10% solution of sodium hydroxide as required.

After completion of this coupling reaction the pH value of the slurry was adjusted to 7.0 by addition from a 10% solution of sodium hydroxide, and the whole heated to 95° C. by feeding in steam, and was maintained at this temperature for 60 minutes. The slurry was filtered under suction and washed with water on the filter until the filtrate contained no detectable chloride ions. The product was dried at 50° to 55° C. and then ground to produce an orange pigment.

The product so obtained, when incorporated into an oil ink varnish exhibited 10% higher colouring strength and greater transparency than a product which had been similarly incorporated into the same oil ink varnish but which had been prepared by a conventional coupling of tetrazotised orthodianisidine and 1-acetoacetylamino-2,4-dimethylbenzene. In this conventional coupling none of the coupling component suspension was added to the tetrazonium salt solution, but instead a tetrazonium salt solution prepared in the manner described in Example 16 was added at a pH between 4.6 and 6.0 and at a temperature between 15° and 20° C., to a coupling component suspension prepared in the manner described in Example 16 and wherein the resultant slurry was heated and the product isolated, dried and ground in the manner described for the product of Example 16.

EXAMPLE 17

A diazonium salt solution was prepared by stirring to a smooth paste 15.2 parts of 2-nitro-4-methylaniline in 200 parts of water containing 25 parts of concentrated hydrochloric acid (specific gravity=1.18) and then diazotising with 6.9 parts of sodium nitrite dissolved in 25 parts of water, whilst maintaining the temperature between minus 5° C. and 0° C. with ice. The diazonium salt solution was clarified by adding one part of activated charcoal and subsequently filtering. The final volume of the diazonium salt solution was adjusted to 500 parts at 0° C. with water and to this solution was added a solution containing one part of the nonionic surface active agent sold under the Trade Mark "Cirrasol ALN-WF" dissolved in 50 parts of water.

The suspension of coupling component was prepared by dissolving 15.1 parts of beta-naphthol and 4.2 parts of sodium hydroxide in 300 parts of water and then adding to this, slowly, a 2N solution of hydrochloric acid whilst stirring vigorously until the pH had fallen to 10.0. The final volume of the coupling component suspension was adjusted with water to 500 parts at 15° C.

10% of the coupling component suspension was added slowly to the stirred diazonium salt solution and the resulting mixture stirred for a further 30 minutes. Then over a period of 60 minutes the diazonium salt solution, containing the small proportion of added coupling component was added to the remainder of the coupling component suspension, with vigorous stirring of the coupling component to ensure that there was never an excess of diazonium salt in the coupling liquor. Throughout the coupling reaction the temperature was maintained between 15° and 20° C. and the pH value was maintained between 10.0 and 10.2 by adding from a 20% solution of sodium carbonate, as required.

After completion of this coupling reaction the pH the value of the slurry was adjusted to 7.0 by adding from a 2N solution of hydrochloric acid, and the whole heated to 70° C. by feeding in steam before filtering off the product under suction and washing with water on the filter until the filtrate contained no detectable chloride ions. The product was dried at 50° to 55° C. and the product was ground to produce a red pigment.

The product so obtained, when incorporated into an air-drying decorative paint medium based on a long oil soya alkyd resin and white spirit exhibited higher colour strength, increased transparency and an attractive bluer shade than a product which had been similarly incorporated into the same decorative paint medium but which had been prepared by a conventional coupling of diazotised 2-nitro-4-methylaniline and beta-naphthol (that is in which none of the coupling component suspension was added to the diazonium salt solution. but instead in which a diazonium salt solution was prepared as described in Example 17 and added under the same conditions of temperature, time and pH value as those described in Example 17 to a coupling component suspension prepared as described in Example 17 and wherein the resultant slurry was heated and the product was isolated, washed, dried and ground by the methods described for the product of Example 17).

EXAMPLE 18

A diazonium salt solution was prepared by stirring to a smooth paste 16.8 parts of 2-methoxy-4-nitroaniline in 300 parts of water containing 25 parts of concentrated hydrochloric acid (specific gravity=1.18) and then diazotising with 6.9 parts of sodium nitrite dissolved in 25 parts of water, whilst maintaining the temperature between minus 5° C. and 0° C. with ice. The diazonium salt solution was clarified by adding one part of activated charcoal and subsequently filtering. The final volume of the diazonium salt solution was adjusted to 500 parts with water at a temperature of 0° C. and to this solution was added a solution containing one part of the nonionic surface active agent sold under the Trade Mark "Cirrasol ALN-WF" dissolved in 50 parts of water.

The suspension of coupling component was prepared by dissolving 21.7 parts of 2-acetoacetylaminoanisole and 4.2 parts of sodium hydroxide in 300 parts of water and then adding to this, slowly, until the pH value was 6.0 from a 25% solution of glacial acetic acid in water. To this suspension was added 20.5 parts of sodium acetate trihydrate and the final volume of the coupling component suspension was adjusted with water to 500 parts at 15° C.

50% of the coupling component suspension was added slowly to the stirred diazonium salt solution and the mixture stirred for a further 60 minutes. Then, over a period of 50 minutes the diazonium salt solution, containing the proportion of added coupling component, was added to the remainder of the coupling component suspension, with vigorous stirring of the coupling component suspension to ensure there was never an excess of diazonium salt in the coupling liquor. Throughout the coupling reaction the temperature was maintained between 15° and 20° C. and the pH value was maintained between 4.4 and 6.0 by adding from a 10% solution of sodium hydroxide if required.

After completion of this coupling reaction the pH value of the slurry was raised to 7.0 by adding from a 10% solution of sodium hydroxide and the whole heated to 95° C. by feeding in steam and maintained at that temperature for 60 minutes before filtering off the product under suction and washing with water on the filter until the filtrate contained no detectable chloride ions. The product was dried at 50° to 55° C. and then ground to produce a yellow pigment.

The product so obtained, when incorporated into an air-drying decorative paint medium based on a long oil soya alkyd resin and white spirit exhibited 10% higher colouring strength and greater hiding power than a product which had been similarly incorporated into the same decorative paint medium but which had been prepared by a conventional coupling of diazotised 2-methoxy-4-nitroaniline and 2-acetoacetylaminoanisole (that is in which none of the coupling component suspension was added to the diazonium salt solution, but instead in which a diazonium salt solution was prepared as described in Example 18 and added under the same conditions of temperature, time and pH value as those described in Example 18 to a coupling component suspension prepared as described in Example 18 and wherein the resultant slurry was heated and the product isolated, washed, dried and ground by the methods described fro the product of Example 18).

EXAMPLE 19

A diazonium salt solution was prepared by first of all dissolving 21 parts of 2-amino-4-chloro-5-methylbenzene sulphonic acid (i.e. 2B acid) in 300 parts of water containing sufficient added ammonium hydroxide solution (specific gravity=0.88) such that the solution was just alkaline to litmus paper. Ice was added to the solution until the temperature was 4° C. and then 6.6 parts of sodium nitrite were added and subsequently 30 parts of concentrated hydrochloric acid (specific gravity=1.18). The final temperature of the diazonium salt solution was 8° C.

The coupling component solution was prepared by dissolving 17.9 parts of 2-hydroxynaphthalene-3-carboxylic acid in 360 parts of water at 15° C. containing 13.4 parts of sodium hydroxide.

20% of the coupling component solution was added slowly to the stirred diazonium salt solution and the resulting mixture stirred for a further 30 minutes. Then, over a period of six minutes the diazonium salt solution, containing the proportion of added coupling component, was added to the remainder of the coupling component solution, with vigorous stirring of the coupling component solution to ensure that there was never an excess of diazonium salt in the coupling liquor. After completion of the coupling reaction the pH value of the coupling liquor was adjusted to 10.0 by small additions of 10% sodium hydroxide solution or 2N hydrochloric acid solution as required and the slurry stirred for a further 30 minutes. Throughout the coupling reaction the temperature of the coupling liquor was maintained between 15° and 20° C. 6.7 parts of the tall oil rosin sold under the Trade Mark Primarex 80 (available from Sylvachem Corporation) were dissolved in 130 parts of water containing 0.9 parts of sodium hydroxide at 70° C. and this solution was added to the stirred slurry over five minutes. After a further five minutes the slurry was heated to 45° C. by feeding in steam and the pH adjusted to 5.8 by adding from a 2N solution of hydrochloric acid. The slurry was stirred for a further ten minutes at this temperature before adding slowly a solution containing 17.5 parts of calcium chloride dihydrate dissolved in 175 parts of water at 45° C. The pH of the slurry was checked and adjusted to 4.5 by adding from a 10% solution of sodium hydroxide or a 2N solution of hydrochloric acid as required and the slurry was then heated to 80° C. by feeding in steam and maintained at this temperature for a further 30 minutes at which time the pH of the slurry had fallen to 3.0. The pH was then raised to 6.75 by adding from a 3% solution of ammonium hydroxide and the product isolated by filtering under suction and washing with water on the filter until the filtrate just became free of detectable chloride ions and finally washing with a solution containing 0.45 parts of calcium chloride dihydrate in 45 parts of water. The presscake so obtained was heated in air at 50° C. until dry and the product ground to produce a red pigment.

The product so obtained, when incorporated into an oil ink varnish exhibited 5% higher strength and greater transparency than a product which had been similarly incorporated into the same oil ink varnish but which had been prepared by a conventional coupling of diazotised 2-amino-4-chloro-5-methylbenzene sulphonic acid and 2-hydroxynaphthalene-3-carboxlyic acid (that is in which none of the coupling component solution was added to the diazonium salt solution, but instead in which a diazonium salt solution was prepared as described in Example 19 and added over six minutes to a coupling component solution prepared as described in Example 19 under the same conditions of temperature and pH as those described in Example 19 and wherein the resultant slurry was resinated, treated with calcium chloride dihydrate and heat-treated and the product isolated, dried and ground in the manner described for the product of Example 19).

EXAMPLE 20

(a) Diazonium salt solution

A diazonium salt solution was prepared by first of all pasting 15.1 parts of 2-methoxy-4-nitroaniline in 200 parts of water containing 22.5 parts of concentrated hydrochloric acid (specific gravity=1.18) and then diazotising with 6.2 parts of sodium nitrite dissolved in 25 parts of water whilst maintaining the temperature between minus 5° C. and 0° C. with ice. The diazonium salt solution was clarified by adding one part of activated charcoal and subsequently filtering. The final volume of the diazonium salt solution was adjusted to 450 parts with water at 0° C.

(b) Tetrazonium salt solution

The tetrazonium salt solution was prepared by stirring to a smooth paste 3.43 parts of 3,3'-dichlorobenzidine dihydrochloride in 20 parts of water containing 5 parts of concentrated hydrochloric acid (specific gravity=1.18) and then tetrazotising in the usual manner with 1.51 parts of sodium nitrite dissolved in 10 parts of water all the while maintaining the temperature between 0° and 5° C. The tetrazonium salt solution was clarified by adding 0.5 parts of activated charcoal and subsequently filtering. The final volume of the tetrazonium salt solution was adjusted to 100 parts with water at a temperature of 0° C.

(c) Coupling component suspension

The suspension of coupling component was prepared by dissolving 21.7 parts of 2-acetoacetylaminoanisole and 4.2 parts of sodium hydroxide in 300 parts of water and then slowly adding, until the pH value fell to 6.0, from a solution containing 6.3 parts of glacial acetic acid in 25 parts of water whilst stirring vigorously.

(d) Preparation of intermediate

First of all 10% of the coupling component suspension (c) was added slowly, and with vigorous stirring, to the tetrazonium salt solution (b) and the mixture stirred for 30 minutes before filtering off the insoluble material. This insoluble material was washed on the filter with 100 parts of water at 0° C. and then re-slurried in 150 parts of water at 0° C. before being added to the diazonium salt solution (a).

(e) Coupling and after-treatment

To the remainder of the coupling component suspension (c) was added 18.5 parts of sodium acetate trihydrate. Then the mixture of diazonium and tetrazonium compounds, containing the proportion of coupling component added to the tetrazonium salt solution, was added over a period of 60 minutes to the remainder of the coupling component suspension (c) with sufficient stirring to ensure that there was never an excess of diazonium or tetrazonium compound in the coupling liquor. Throughout the coupling reaction the temperature was maintained between 15° and 20° C. After completion of this coupling reaction the pH of the slurry was raised to 7.0 by adding from a 10% solution of sodium hydroxide. The slurry was heated to 95° C. by feeding in steam and was maintained at this temperature for 60 minutes before filtering under suction and washing with water on the filter until the filtrate contained no detectable chloride ions. The product was dried at 50° to 55° C. and ground to produce a yellow pigment.

The product so obtained, when incorporated into an air-drying decorative paint medium based on a long oil soya alkyd resin and white spirit exhibited 8% higher colouring strength and greater hiding powder than a product which had been similarly incorporated into the same decorative paint medium but which had been prepared by a conventional coupling of tetrazotised 3,3'-dichlorobenzidine and diazotised 2-methoxy-4-nitroaniline with 2-acetoacetylaminoanisole (that is in which none of the coupling component suspension was added to the tetrazonium salt solution, but instead in which a diazonium salt solution was prepared as described in section (a) of Example 20 and added to a tetrazonium salt solution which was prepared as described in section (b) of Example 20 and this mixture of diazonium and tetrazonium salts added under the same conditions of temperature, time and pH value as those described in Example 20 to a coupling component suspension prepared as described in section (c) of Example 20, buffered with the same amount of sodium acetate trihydrate as described in section (c) of Example 20 and wherein the resultant slurry was heated and the product isolated, dried and ground by the methods described for the product of Example 20).

We claim:

1. A method of dyeing plastics, paints, printing inks and oil-based gravure-printing pastes and inks which comprises adding thereto an effective pigmenting amount of a monoazo or disazo pigment prepared by
   (a) adding to a solution of a diazonium or tetrazonium salt of an aromatic or heterocyclic amine a solution or suspension containing 0.1–50% by weight of the theorectically required total weight of one or more coupling components, and
   (b) using the product from step (a) as an additive in the production of a monoazo pigment, a disazo pigment or a mixture of monoazo and disazo pigments.

2. A process according to claim 1, wherein 0.1%–30% by weight of the theorectically required total weight of one or more coupling components is used in step (a).

3. A process according to claim 1, wherein 1–30% by weight of the theorectically required total weight of one or more coupling components is used in step (a).

4. A process according to claim 1, wherein one or two coupling components are used in step (a).

5. A process according to claim 1, wherein one or two coupling components are used in step (b).

6. A process according to claim 1, wherein one coupling component is used in each of steps (a) and (b).

7. A process according to claim 1, wherein the same coupling component is used in each of steps (a) and (b).

8. A process according to claim 1, wherein a tetrazonium salt is used.

9. A process according to claim 1, wherein the tetrazonium salt is a tetrazotised 3,3'-dichlorobenzidine, an o-dianisidine, a tetrachlorobenzidine, a dinitrobenzidine, an o,o'-dimethylbenzidine or a 2,2'-disulfobenzidine.

10. A process according to claim 1, wherein the diazonium salt is a diazotised heterocyclic amine or an aniline derivative, which can be substituted with one or more alkyl, aryl, aralkyl, nitro, alkoxy, aryloxy or halogen groups.

11. A process according to claim 1, wherein the diazonium salt is a diazotised aniline containing water-solubilising groups.

12. A process according to claim 1, wherein the coupling component used in steps (a) and (b) is an acetoacetarylamide or a pyrazolone.

13. A method of dyeing plastics, paints, printing inks and oil-based gravure-printing pastes and inks which comprises adding thereto an effective pigmenting amount of a monoazo or disazo pigment prepared by
   (a) adding to a solution of a diazonium or tetrazonium salt of an aromatic or heterocyclic amine a solution or suspension containing 0.1–50% by weight of the theorectically required total weight of one or more coupling components, and
   (b) completing the coupling reaction by adding the partially coupled product obtained according to step (a) to a solution or suspension of one or more coupling components identical to or different from those used in step (a).

* * * * *